April 30, 1935. D. P. RUGER 1,999,981
EXPANSION JOINT FOR ELECTRIC CABLES
Filed Jan. 17, 1931

Inventor:
Durl P. Ruger

Patented Apr. 30, 1935

1,999,981

UNITED STATES PATENT OFFICE 1,999,981

EXPANSION JOINT FOR ELECTRIC CABLES

Durl P. Ruger, Chicago, Ill., assignor to G & W Electric Specialty Co., Chicago, Ill., a corporation of Illinois Application January 17, 1931, Serial No. 509,290

22 Claims. (Cl. 173—269)

This invention relates to electric cable connector and particularly to an expansion joint for cables.

One of the objects of the invention is to provide a joint between the cable and its terminal piece that will be capable of taking up expansion and allowing for contraction of the cable.

Another object of the invention is to provide a connector that will take up expansion and contraction by means of a telescopic arrangement.

Another object of the invention is to provide means within the telescopic arrangement to produce sufficient frictional contact between the parts to insure proper connectivity.

Figure 1:
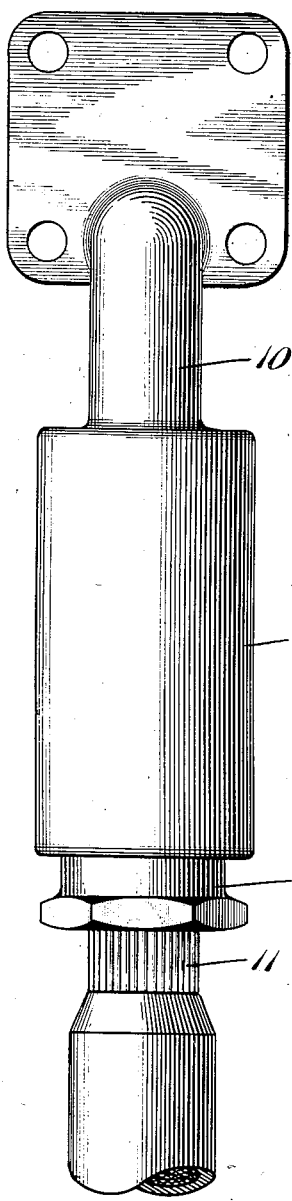
Fig. 1 is a side elevation of the device.
Figure 2:
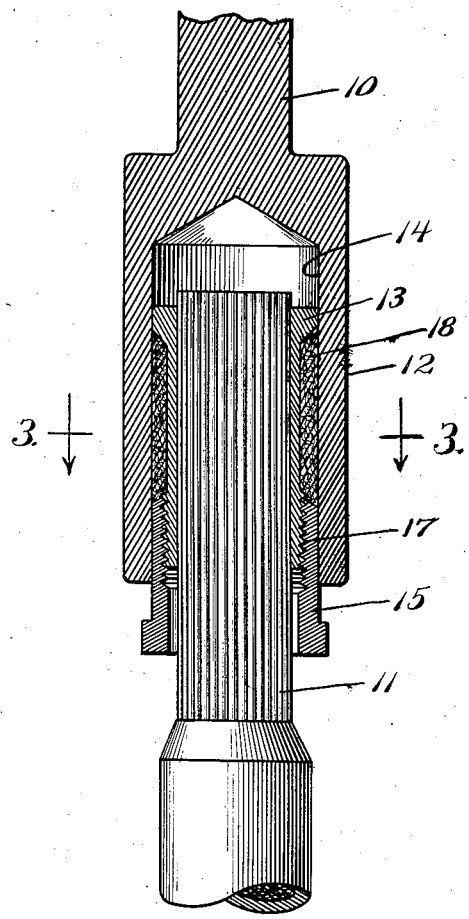
Fig. 2 is an axial section therethrough.
Figure 3:
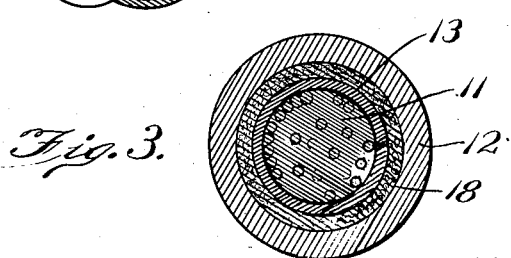
Fig. 3 is a trans-axial section taken at the line 3—3 on Fig. 2.

It is common practice to connect electric cables by a clamping device which will neither distort the cable nor fail to make proper contact therewith, and therefore fail to make proper electric contact to fully carry the current. This device contemplates means for overcoming these disadvantages and producing an expansion joint whereby there will be no relative movement between the cable strands themselves and any part of the connector.

The drawing shows a cable terminal 10 for connection to a bus-bar or any device to be served. The current is delivered by the cable 11 through a telescopic arrangement consisting of the enlarged portion or housing 12 of the terminal 10, and a sleeve 13 which is soldered or otherwise secured to the cable. The sleeve 13 has a sliding fit within the bore 14 of the housing 12 as also has a packing gland or nut 15. The gland 15 and the sleeve 13 have screw-threaded engagement at 17. The sleeve 13 is reduced in diameter for a part of its length to form a space between it and the bore 14 of the housing 12. The resulting space is filled with some sort of metallic packing, preferably in the nature of metallic wool; that is, finely stranded fiber of metal as indicated at 18.

In assembling the joint, the sleeve 13, carrying the packing gland 15, is first soldered to the cable 11. The packing material 18 is then introduced in the bore 14 together with the gland 15 and upon rotating the gland 15 the packing material 18 will be pressed longitudinally and will tend to expand laterally, at least to a sufficient extent to properly conduct the current from the sleeve 13 to the housing 12.

The packing material 18 will be of such material as will not set up any electrical reactance within the housing; as for instance, zinc fibers would not be desirable where the housing is made of copper. In other words, the metals will be chosen with a view to avoid any undesirable consequences of any electrical reaction that might be set up by complementary metalism.

It will be understood that in many installations where the current is sufficiently heavy or continuous to heat the conductor cable 11, it will expand longitudinally, and when the current is cut off the cable will contract again to its normal length. It is this action that is sought to be accommodated.

This application's disclosure is related to the disclosure of Ruger, Serial No. 509,289, filed January 17, 1931, Solderless connection for electric cable, and certain features of the invention are claimed in said other application.

Though I have shown and described a particular embodiment of my invention, it will be understood that many changes and modifications may be made within the scope of conception.

I claim:

1. In a device of the character described including a cable, a terminal fitting at the end thereof, a telescopic joint connecting the cable and the fitting, a sleeve rigidly attached to the cable end, a housing formed in the said fitting, packing in the housing surrounding the said sleeve, a gland having screw-threaded engagement with the said sleeve for laterally distending the said packing to increase its frictional contact with the said housing.

2. In a device of the character described including a cable, a terminal fitting at the end thereof, a telescopic joint connecting the cable and the fitting, a sleeve on the cable and, a housing formed in the said fitting, metallic packing in the housing surrounding the said sleeve, and means carried by and having adjustable connection with the said sleeve for acting on the said packing to increase its frictional contact with the housing.

3. In a device of the character described including a cable, a terminal fitting at the end thereof, a telescopic joint connecting the cable and the fitting, a sleeve on the cable end, a housing formed in the said fitting, packing in the housing surrounding the said sleeve, a gland having screw-threaded engagement with the said sleeve for laterally distending the said packing to increase its frictional contact with the said housing.

4. In a device of the character described, including a cable, a terminal fitting recessed to receive one end of the cable, a cable securing unit mounted within the recessed terminal comprising a sleeve and a packing gland nut carried thereby and adjustable thereon, and metallic packing surrounding the sleeve and electrically connecting same with fitting.

5. In a device of the character described, including a cable, a terminal fitting attached to said cable, a telescopic connection between the two comprising two elements attached together, and a metallic packing interposed between the telescopic connection and the terminal fitting for securing the parts together and electrically connecting same with one another.

6. In a device of the character described, including a cable, a terminal fitting at the end thereof, and frictional means for joining and electrically connecting the said two parts, said means comprising a sleeve, means attached to said sleeve for holding and compressing packing, and a metallic packing held and compressed by said last mentioned means.

7. A device of the class specified comprising a terminal having a recess to receive a cable conductor end, a sleeve surrounding and contacting said cable conductor end and located in said recess, said sleeve for a portion of its length being smaller than the terminal recess to allow space between the sleeve and terminal, metallic packing in said space contacting the sleeve and terminal, and means for compressing said packing against said sleeve and terminal wall to insure good electrical connection between the cable and terminal, said means being connected with said sleeve and provided with means for causing adjustment relatively thereto.

8. A device of the class specified comprising a terminal having a recess to receive a cable end, a sleeve arranged in the recess and surrounding and contacting the cable end, said sleeve having a portion smaller than the terminal recess to form a space between sleeve and terminal wall, metallic packing in said recess, and a threaded nut fitted to the threaded end of said sleeve and arranged to force said packing inwardly and against the sleeve and terminal wall.

9. A device of the class specified comprising a terminal having a recess to receive a cable end, a sleeve arranged within said recess and surrounding and contacting said cable end, the inner end of said sleeve being substantially the size of the cable recess and the remaining portion of said sleeve being smaller than the cable recess so as to afford space between the sleeve and terminal, the outer end of said sleeve being screw threaded, metallic packing in the space between the sleeve and terminal wall, and a threaded nut arranged on the threaded end of said sleeve and having its end projecting outside of the terminal to permit the nut to be turned to force the metallic packing inward and against the sleeve and terminal.

10. A device of the class specified comprising a housing adapted to receive a cable conductor, a packing holding element arranged within the housing and carried by the cable conductor, metallic packing carried by said element and electrically connected with the cable conductor and means for compressing said packing, said element and compressing means forming with the housing a substantially closed chamber for the packing, and said element and compressing means being provided with co-operating means for causing relative adjustment between the same to compress the packing.

11. A device of the class specified comprising a terminal housing having a recess for the cable conductor, a packing holder arranged within said housing, and carried by the cable conductor, metallic packing carried by said holder and electrically connected with the cable conductor, and a threaded element having threaded connection with said holder and forming therewith and with the housing a substantially closed chamber for the packing, adapted for adjustment to compress said packing in said holder.

12. A device of the class specified comprising a terminal housing having a recess for a cable conductor, a packing holder carried by and secured to the cable conductor, metallic packing carried by said holder and in contact therewith, and means for compressing the packing in the holder.

13. A device of the class specified comprising a terminal housing having a recess for a cable conductor, a packing holder carried by and secured to the cable conductor, metallic packing carried by said holder and in contact therewith, and means for compressing the packing in the holder, said means being carried by the packing holder to permit compression of the packing while the same is being carried by said holder.

14. A device of the class specified comprising a terminal housing having a recess for a cable conductor, means adapted to be carried by the cable conductor for holding packing and compressing same, said means comprising an element for holding the packing and another element having adjusting connection with said first mentioned element for compressing the packing, and metallic packing in said holder in position to be compressed by said second mentioned element.

15. A device of the class specified comprising a terminal housing having a recess for a cable conductor, a packing holding element adapted to be carried by said conductor and having a recess for the packing between the conductor and the housing wall, metallic packing in said recess, and means for compressing said packing in said recess said means comprising an element carried by said holder and having adjusting connection therewith.

16. A device of the class specified comprising a terminal housing having a recess for a cable conductor, a packing holding element adapted to be carried by said conductor and having a recess for the packing between the conductor and the housing wall, metallic packing in said recess, and means for compressing said packing in said recess, said means comprising a threaded gland carried by said packing holding element, adapted to be screwed longitudinally against the packing so as to compress the same.

17. A device of the class specified comprising a terminal housing having a recess for a cable conductor, a packing holding element adapted to be carried by said conductor and having a recess for the packing between the conductor and the housing wall, metallic packing in said recess, and means carried by and having adjusting connection with said packing holding element for compressing said packing in said recess, said recess being also adjacent the wall of the terminal housing recess so that the packing in the recess will contact the packing carrying element and also the wall of said recess.

18. A device of the class specified comprising a terminal housing having a recess for a cable conductor, a packing holding element adapted to be carried by said conductor and having a recess for the packing between the conductor and the housing wall, metallic packing in said recess, and means for compressing said packing in said recess, said recess being substantially closed and being also adjacent the wall of the terminal housing recess so that the packing in the recess will contact the packing carrying element and also the wall of said recess, the said compressing means comprising a threaded element carried by and having threaded connection with said packing holding element.

19. A device of the class specified comprising a terminal housing having a recess for a cable conductor, a tubular member surrounding the cable conductor and secured thereto, said tubular member being adapted to fit and slide longitudinally in said housing recess and metallic packing surrounding said tubular member and interposed between the same and the housing recess wall to afford electrical connection between the cable conductor and housing and at the same time to afford a covering for the cable conductor to provide a smooth surface for the compression of the packing.

20. A device of the class specified comprising a terminal housing having a recess for a cable conductor, a tubular member surrounding the cable conductor and secured thereto, said tubular member being adapted to fit and slide longitudinally in said housing recess and having a packing holding recess and metallic packing in said tubular member recess adapted to afford electrical connection between the cable conductor and housing and at the same time to afford a smooth surface for the compression of the packing, and means for compressing the metallic packing between the tubular element and housing wall for bettering the electrical connection.

21. A device for the class specified comprising a terminal housing having a recess for a cable conductor, a tubular member surrounding the cable conductor and secured thereto and having a packing holding recess, said tubular member being adapted to fit and slide longitudinally in said housing recess and metallic packing in said tubular member recess between the tubular element and the housing recess wall to afford electrical connection between the cable conductor and housing and at the same time to afford a covering for the cable conductor to provide a better surface for the compression of the packing, and means for compressing the metallic packing between the tubular element and housing wall for bettering the electrical connection, said means comprising a gland nut having a threaded connection with the tubular element.

22. A device of the class specified comprising a terminal housing having a recess for a cable conductor, a tubular member adapted to surround the cable conductor and contact therewith, said tubular member being arranged to fit and slide in said housing recess, the inner end of said tubular member being of substantially the size of the recess so as to fit snugly within the same and the intermediate portion of said tubular member being of reduced size so as to afford a space between itself and the housing, metallic packing in said space, and a gland nut having threaded connection with the outer end of said tubular member, said gland nut having a portion of its length of substantially the size of said housing recess so as to fit snugly in the same and thereby provide a substantially closed chamber for the packing between the enlarged end of the tubular member and the inner end of said gland nut.

DURL P. RUGER.